(12) United States Patent
Baldini Soares et al.

(10) Patent No.: US 10,922,348 B2
(45) Date of Patent: Feb. 16, 2021

(54) REPRESENTATION OF A DATA ANALYSIS USING A FLOW GRAPH

(71) Applicant: International Business Machines Corporation, Armonk, NY (US)

(72) Inventors: Ioana Monica Baldini Soares, Irvington, NY (US); Aleksandra Mojsilovic, New York, NY (US); Evan J. Patterson, Redwood City, CA (US); Kush Raj Varshney, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/841,018

(22) Filed: Dec. 13, 2017

(65) Prior Publication Data

US 2018/0189389 A1 Jul. 5, 2018

Related U.S. Application Data

(63) Continuation of application No. 15/399,420, filed on Jan. 5, 2017.

(51) Int. Cl.
*G06F 16/36* (2019.01)
*G06F 16/955* (2019.01)
*G06F 16/901* (2019.01)

(52) U.S. Cl.
CPC .......... *G06F 16/367* (2019.01); *G06F 16/374* (2019.01); *G06F 16/9024* (2019.01); *G06F 16/9558* (2019.01)

(58) Field of Classification Search
CPC .. G06F 16/367; G06F 16/374; G06F 16/9024; G06F 16/9558
See application file for complete search history.

(56) References Cited

U.S. PATENT DOCUMENTS

| 5,933,640 A | 8/1999 | Dion |
| 6,253,370 B1 | 6/2001 | Abadi et al. |
| 6,389,587 B1 | 5/2002 | Lewis |

(Continued)

OTHER PUBLICATIONS

"Open Science Data Cloud," opensciencedatacloud.org, Last accessed Nov. 14, 2016, 5 pages.

(Continued)

*Primary Examiner* — Miranda Le
(74) *Attorney, Agent, or Firm* — Amin, Turocy & Watson, LLP

(57) ABSTRACT

Techniques facilitating using flow graphs to represent a data analysis program in a cloud based system for open science collaboration and discovery are provided. In an example, a system can represent a data analysis execution as a flow graph where vertices of the flow graph represent function calls made during the data analysis program and edges between the vertices represent objects passed between the functions. In another example, the flow graph can then be annotated using an annotation database to label the recognized function calls and objects. In another example, the system can then semantically label the annotated flow graph by aligning the annotated graph with a knowledge base of data analysis concepts to provide context for the operations being performed by the data analysis program.

7 Claims, 12 Drawing Sheets

(56) References Cited

U.S. PATENT DOCUMENTS

| | | | |
|---|---|---|---|
| 6,839,730 B1* | 1/2005 | Ramabhadran | H04L 29/06 |
| | | | 707/999.003 |
| 7,065,634 B2 | 6/2006 | Lewis et al. | |
| 7,117,490 B2 | 10/2006 | Harrison, III et al. | |
| 7,228,528 B2* | 6/2007 | Wang | G06F 9/3822 |
| | | | 717/131 |
| 7,353,505 B2* | 4/2008 | O'Dowd | G06F 11/3636 |
| | | | 714/E11.212 |
| 7,543,285 B2 | 6/2009 | Cabillic et al. | |
| 7,606,893 B2 | 10/2009 | Petrov et al. | |
| 7,657,876 B2* | 2/2010 | Chilimbi | G06F 11/3636 |
| | | | 717/130 |
| 7,712,024 B2* | 5/2010 | Reynar | G06Q 30/02 |
| | | | 707/739 |
| 7,739,553 B2 | 6/2010 | Bendapudi et al. | |
| 7,844,959 B2 | 11/2010 | Isard | |
| 7,941,789 B2* | 5/2011 | Ivanov | G06F 11/3495 |
| | | | 714/45 |
| 8,021,221 B2 | 9/2011 | Lydon et al. | |
| 8,276,124 B2 | 9/2012 | Maennel | |
| 8,301,755 B2 | 10/2012 | De Peuter et al. | |
| 8,359,584 B2 | 1/2013 | Rao et al. | |
| 8,475,251 B2 | 7/2013 | Lydon et al. | |
| 8,516,045 B2 | 8/2013 | Ordille et al. | |
| 8,537,160 B2 | 9/2013 | Hargrove et al. | |
| 8,578,389 B1* | 11/2013 | Boucher | G06F 9/4494 |
| | | | 718/106 |
| 8,850,415 B2 | 9/2014 | Huuck et al. | |
| 8,990,792 B2 | 3/2015 | Gorelkina | |
| 9,158,838 B2* | 10/2015 | Peoples | G06F 16/3331 |
| 9,171,102 B1 | 10/2015 | Zlatnik | |
| 9,201,659 B2* | 12/2015 | Dhurjati | G06F 9/3885 |
| 9,286,042 B2* | 3/2016 | Gounares | G06F 9/44505 |
| 9,348,560 B2 | 5/2016 | Xie et al. | |
| 9,405,854 B2* | 8/2016 | Jerzak | G06F 16/9024 |
| 9,436,507 B2 | 9/2016 | Mishra et al. | |
| 9,483,236 B2* | 11/2016 | Yershov | G06F 8/315 |
| 9,524,366 B1* | 12/2016 | Watanabe | G06F 30/327 |
| 9,600,250 B2 | 3/2017 | Varadarajan et al. | |
| 9,612,807 B2 | 4/2017 | de Lima Ottoni | |
| 9,652,286 B2 | 5/2017 | Fan | |
| 9,665,474 B2 | 5/2017 | Li et al. | |
| 9,665,660 B2 | 5/2017 | Wensel | |
| 9,734,040 B2 | 8/2017 | Gounares | |
| 9,760,348 B2* | 9/2017 | Varadarajan | G06F 8/437 |
| 2004/0001099 A1* | 1/2004 | Reynar | G06F 17/272 |
| | | | 715/776 |
| 2004/0216096 A1* | 10/2004 | Messer | G06F 9/5066 |
| | | | 717/154 |
| 2004/0264367 A1* | 12/2004 | Edwards | G06F 8/433 |
| | | | 370/229 |
| 2006/0224974 A1 | 10/2006 | Albrecht et al. | |
| 2006/0229931 A1 | 10/2006 | Fligler et al. | |
| 2009/0217248 A1 | 8/2009 | Bently et al. | |
| 2009/0281830 A1 | 11/2009 | McNames et al. | |
| 2012/0137277 A1 | 5/2012 | Varadarajan et al. | |
| 2013/0055221 A1* | 2/2013 | Murthy | G06F 11/3608 |
| | | | 717/132 |
| 2013/0085821 A1 | 4/2013 | Douceur et al. | |
| 2013/0205286 A1 | 8/2013 | Barraclough et al. | |
| 2013/0298112 A1 | 11/2013 | Gounares et al. | |
| 2013/0332449 A1 | 12/2013 | Amos et al. | |
| 2014/0025691 A1* | 1/2014 | Jain | G06F 16/80 |
| | | | 707/754 |
| 2014/0040275 A1 | 2/2014 | Dang et al. | |
| 2014/0058782 A1 | 2/2014 | Graves, Jr. | |
| 2014/0115565 A1 | 4/2014 | Abraham et al. | |
| 2014/0215444 A1* | 7/2014 | Voccio | G06F 11/3636 |
| | | | 717/128 |
| 2015/0143339 A1 | 5/2015 | Rajanna et al. | |
| 2015/0180883 A1 | 6/2015 | Aktas et al. | |
| 2015/0235282 A1 | 8/2015 | Kamath | |
| 2015/0293750 A1 | 10/2015 | Yershov et al. | |
| 2015/0332283 A1 | 11/2015 | Witchey | |
| 2016/0012424 A1 | 1/2016 | Simon et al. | |
| 2016/0170725 A1 | 6/2016 | Holton et al. | |
| 2016/0170727 A1 | 6/2016 | Mars et al. | |
| 2016/0232032 A1* | 8/2016 | Azvine | G06F 9/542 |
| 2016/0283345 A1* | 9/2016 | Gounares | G06F 11/302 |
| 2016/0323109 A1 | 11/2016 | McCoy et al. | |
| 2016/0328309 A1 | 11/2016 | Morgan et al. | |
| 2017/0011095 A1 | 1/2017 | Wang et al. | |
| 2017/0031676 A1 | 2/2017 | Cecchetti et al. | |
| 2017/0060387 A1 | 3/2017 | Hachmeister et al. | |
| 2017/0109144 A1* | 4/2017 | Spoon | G06F 11/3604 |

OTHER PUBLICATIONS

Simmhan, Y., et al., "A Survey of Data Provenance in e-Science," ACM SIGMOD Record, Sep. 2005, vol. 34, No. 3, pp. 31-36.

Simmhan, Y., et al., "A Survey of Data Provenance Techniques," Technical Report IUB-CS-TR618, 2005, 25 pages.

Angelino, E., et al., "StarFlow: A Script-Centric Data Analysis Environment," International Provenance and Annotation Workshop, 2010, 15 pages.

Callahan, S. P., et al., "VisTrails: visualization meets data management," Proceedings of the 2006 ACM SIGMOD International Conference on Management of Data, 2006, pp. 745-747.

Brachman, R., et al., "Knowledge Representation and Reasoning," 2004, 413 pages, Elsevier, San Francisco, CA.

Davis, R., et al., "What is a knowledge representation?," AI Magazine, 1993, vol. 14, No. 1, pp. 17-33.

Minsky, M. "A Framework for Representing Knowledge," MIT-AI Laboratory Memo 306, Jun. 1974, 108 pages, http://web.media.mit.edu/~minsky/papers/Frames/frames.html.

Berners-Lee, T., et al., "The Semantic Web," Scientific American, May 17, 2004, vol. 284, 36 pages.

Spivak, D., et al., "Ologs: a Categorical Framework for Knowledge Representation," PLoS One, 2012, 22 pages.

Hind, M., "Pointer Analysis: Haven't We Solved This Problem Yet?" Proceedings of the 2001 ACM SIGPLAN-SIGSOFT Workshop on Program Analysis for Software Tools and Engineering, 2001, 8 pages.

Lienhard, A., "Dynamic Object Flow Analysis," 2008, 180 pages.

Lienhard, A., et al., "Taking an Object-Centric View on Dynamic Information with Object Flow Analysis," Computer Languages, Systems & Structures, 2009, vol. 35, No. 1, pp. 63-79.

Lienhard, A., et al., "Practical Object-Oriented Back-in-Time Debugging," European Conference on Object-Oriented Programming, 2008, 25 pages.

Pérez, F., et al., "IPython: A System for Interactive Scientific Computing," Computing in Science & Engineering, 2007, vol. 9, pp. 21-29.

Ragan-Kelley, M., et al., "The Jupyter/IPython architecture: a unified view of computational research, from interactive exploration to communication and publication," AGU Fall Meeting Abstracts, 2014, 2 pages.

Pedregosa, F., et al., "Scikit-learn: Machine Learning in Python," Journal of Machine Learning Research, 2011, vol. 12, pp. 2825-2830.

Gallo, G., et al., "Directed hypergraphs and applications," Discrete Applied Mathematics, 1993, vol. 42, pp. 177-201.

Knime, https://www.knime.org/, Last accessed Nov. 15, 2016, 1 page.

Orange, http://orange.biolab.si/, Last accessed Nov. 15, 2016, 9 pages.

"SPSS Modeler," IBM, http://www-03.ibm.com/software/products/en/spss-modeler, Last accessed Nov. 15, 2016, 2 pages.

RapidMiner, https://rapidminer.com/, Last accessed Nov. 15, 2016, 4 pages.

VisTrails, https://www.vistrails.org/index.php/Main_Page, Last accessed Nov. 15, 2016, 4 pages.

Google Documents, https://www.google.com/docs/about/, Last accessed Nov. 15, 2016, 8 pages.

SourceForge, https://sourceforge.net/, Last accessed Nov. 15, 2016, 3 pages.

GitHub, https://github.com/, Last accessed Nov. 15, 2016, 4 pages.

(56) References Cited

OTHER PUBLICATIONS

Kaggle, https://www.kaggle.com/, Last accessed Nov. 15, 2016, 4 pages.
Driven Data, https://www.drivendata.org/, Last accessed Nov. 15, 2016, 5 pages.
Dream Challenges, http://dreamchallenges.org/, Last accessed Nov. 15, 2016, 8 pages.
OpenML, http://www.openml.org/, Last accessed Nov. 15, 2016, 5 pages.
Domino Data Lab, https://www.dominodatalab.com/, Last accessed Nov. 15, 2016, 4 pages.
IBM Data Science Experience, http://datascience.ibm.com/, Last accessed Nov. 15, 2016, 7 pages.
Microsoft Azure Machine Learning, https://azure.microsoft.com/en-us/services/machine-learning/, Last accessed Nov. 15, 2016, 11 pages.
"IBM Watson Health Announces Collaboration to Study the Use of Blockchain Technology for Secure Exchange of Healthcare Data," Gale Group Trade &Industry, 2017, 3 pages.
Disclosed Anonymously, "Method of flexible group trading using blockchain and differential pricing," ip.com, 2016, 6 pages.
Tang, et al., "Reflecting on the DARPA Red Balloon Challenge," Communications of the ACM, vol. 54 No. 4, 2011, 8 pages.
Platforms are being developed in academia for fostering reproducibility in Science: reproduciblescience.org, last accessed May 8, 2017.
Non-Final Office Action received for U.S. Appl. No. 15/609,586, dated Jun. 8, 2018, 31 pages.
Office Action dated Sep. 21, 2018 for U.S. Appl. No. 15/609,586, 37 pages.
Office Action dated Sep. 21, 2018 for U.S. Appl. No. 15/842,384, 39 pages.
Non-Final Office Action received for U.S. Appl. No. 15/399,420, dated Feb. 21, 2019.
Non-Final Office Action received for U.S. Appl. No. 15/842,384, dated Mar. 28, 2019.
Vishwanathan, et al., "Graph Kernels," Journal of Machine Learning Research 11 (2010), pp. 1201-1242.
acceleratedcure.org, "Innovation: New Breakthroughs in MS Research," https://www.acceleratedcure.org/, Retrieved: Apr. 29, 2019, 3 pages.
Losch, et al., "Graph Kernels for RDF Data," Last Accessed: Apr. 29, 2019, 15 pages.
science.sciencemag.org, "The Rise of Open Access," https://science.sciencemag.org/content/342/6154/58.full, Oct. 4, 2013, vol. 342, Issue 6154, pp. 58-59.
Non-Final Office Action received for U.S. Appl. No. 15/842,384, dated Jun. 8, 2018, 29 pages.
Final Office Action received for U.S. Appl. No. 15/399,420 dated May 23, 2019, 30 pages.
Notice of Allowance for U.S. Appl. No. 15/842,384 dated Jul. 24, 2019, 39 pages.
List of IBM Patents or Applications Treated as Related.
Office Action received for U.S. Appl. No. 15/399,420 dated Dec. 12, 2019, 33 pages.
Mel, et al., "The NIST Definition of Cloud Computing," Recommendations of the National Institute of Standards and Technology, NIST Special Publication 800-145, Sep. 2011, 7 pages.
Final Office Action received for U.S. Appl. No. 15/399,420 dated Mar. 27, 2020, 33 pages.
Non-Final Office Action received for U.S. Appl. No. 16/664,501 dated Jun. 23, 2020, 69 pages.
Office Action received for U.S. Appl. No. 16/664,501 dated Sep. 30, 2020, 44 pages.
Notice of Allowance received for U.S. Appl. No. 15/399,420 dated Sep. 17, 2020, 51 pages.

\* cited by examiner

900

902

GENERATING, BY AN DEVICE OPERATIVELY COUPLED TO A PROCESSING UNIT, A DIRECTED ACYCLIC GRAPH THAT TRACES A FLOW OF OBJECTS DURING EXECUTION OF A DATA ANALYSIS PROGRAM, WHEREIN VERTICES OF THE DIRECTED ACYCLIC GRAPH CORRESPOND TO RESPECTIVE FUNCTION CALLS

904

ANNOTATING, BY THE DEVICE, THE DIRECTED ACYCLIC GRAPH BY ATTACHING AN ANNOTATION TO A VERTEX OF THE VERTICES, WHEREIN THE VERTEX CORRESPONDS TO A RECOGNIZED FUNCTION CALL, AND WHEREIN THE ANNOTATING GENERATES AN ANNOTATED FLOW GRAPH

906

GENERATING, BY THE DEVICE, A SEMANTIC FLOW GRAPH BY MATCHING THE ANNOTATED FLOW GRAPH TO SEMANTIC TERMS OF A KNOWLEDGE DATABASE

FIG. 9

REPRESENTATION OF A DATA ANALYSIS USING A FLOW GRAPH

BACKGROUND

The subject disclosure relates to data representation, and more specifically to representing data analysis using flow graphs for open data science collaboration and discovery.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for semantic labeling are described.

According to an embodiment, a system can comprise a memory that stores computer executable components; and a processor that executes computer executable components stored in the memory. The computer executable components can comprise a graphing component that generates a flow graph that represents an object flow of a data analysis program, where a node of the graph represents a function call in the data analysis program, and an edge connected to the node represents an output of a function associated with the function call. The computer executable components can also comprise an annotation component that annotates the flow graph, resulting in an annotated flow graph that comprises an annotation label on a recognized function call. The computer executable components can also comprise a semantic labeling component that matches the annotated flow graph to a set of semantic labels in a knowledge database resulting in a semantic flow graph.

According to an embodiment, a computer-implemented method can comprise generating, by an device operatively coupled to a processing unit, a directed acyclic graph that traces a flow of objects during execution of a data analysis program, wherein vertices of the directed acyclic graph correspond to respective function calls. The computer-implemented method can also comprise annotating, by the device, the directed acyclic graph by attaching an annotation to a vertex of the vertices, wherein the vertex corresponds to a recognized function call, and wherein the annotating generates an annotated flow graph. The computer-implemented method can also comprise generating, by the device, a semantic flow graph by matching the annotated flow graph to semantic terms of a knowledge database.

According to yet another embodiment, a computer program product for semantic labeling can comprise a computer readable storage medium having program instructions embodied therewith. The program instructions can be executable by a processing component and cause the processing component to: generate a flow graph that represents an object flow of a data analysis program, where a node of the graph represents a function call in the data analysis program, and an edge connected to the node represents an output of a function associated with the function call. The processing component can also annotate the flow graph, resulting in an annotated flow graph that comprises a first annotation label on a recognized function call and a second annotation label on an edge between nodes of the annotated flow graph that identify an object being passed from a first node to a second node of the nodes. The processing component can also select a semantic label for one or more annotation labels based on matching the annotation flow graph to semantic labels in a knowledge database selected based on the data analysis program.

DESCRIPTION OF THE DRAWINGS

FIG. 9 illustrates a flow diagram of an example, non-limiting computer-implemented method that facilitates semantic labeling of data analysis programs in accordance with one or more embodiments described herein.

DETAILED DESCRIPTION

Figure 1:
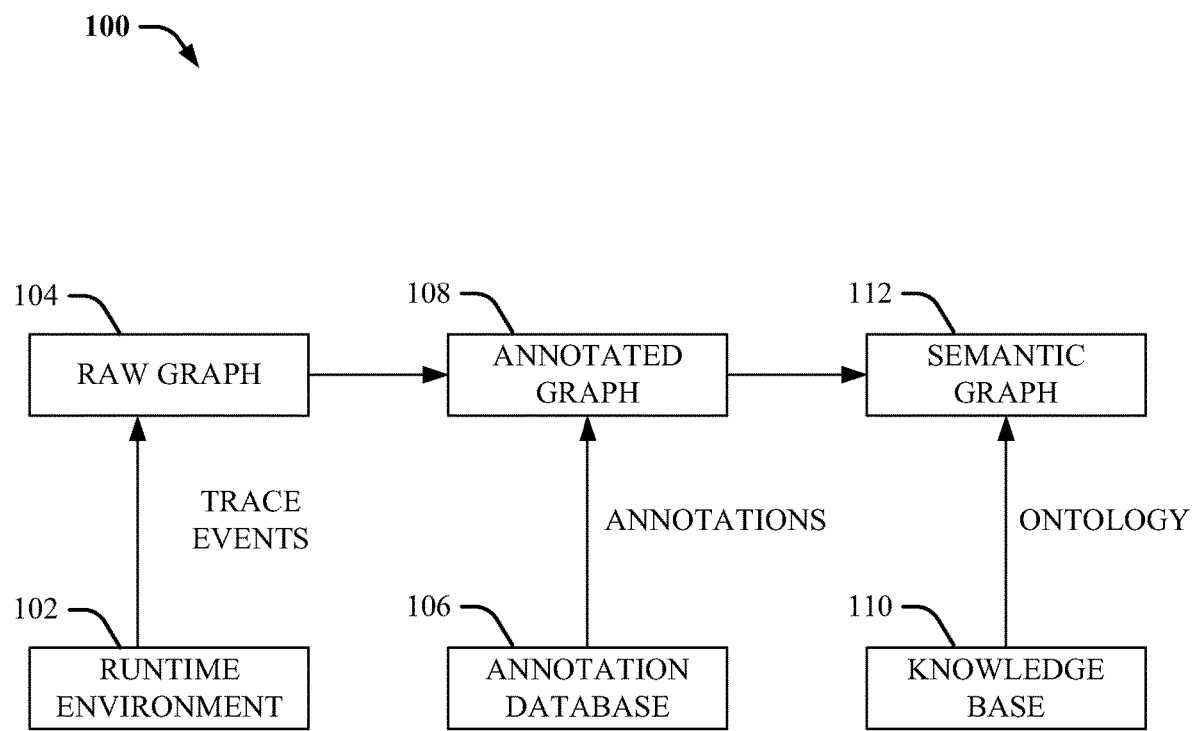
FIG. 1 illustrates a block diagram of an example, non-limiting pipeline schematic of dataflow graph transformation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments disclosed herein, provided is a system that facilitates using flow graphs to represent a data analysis program in a cloud based system for open data science collaboration and discovery system. The system can represent a data analysis execution as a flow graph where vertices of the flow graph represent function calls made during the data analysis program and edges between the vertices represent objects passed between the functions. The flow graph can then be annotated using an annotation database to label the recognized function calls and objects. The system can then semantically label the annotated flow graph by aligning the annotated graph with a knowledge base of data analysis concepts to provide context for the operations being performed by the data analysis program. A data analysis concept can be a particular statistical analysis algorithm or data regression algorithm to process a set of data. The data analysis programs can be computer programs that implement one or more of these concepts to process data.

In an embodiment, this disclosure can also provide a way for scientists and other researchers around the world to work collaboratively on data analysis tasks. The platform disclosed herein allows instant access to datasets that can be used in data-driven analyses for different categories of problems. The platform can also facilitate the collaboration between entities by, for example, automatically identifying similar data analyses, recommending analyses to particular entities, or summarizing the analyses on the platform. It can do this according to the objectives, datasets, and methods implicit in the analyses as labeled by the semantic labeling system. The platform can also offer several statistical metaanalyses that can scale with large number of entities, large number of datasets and large number of data-driven collaborations. In an embodiment, the platform can enable meta-analysis by incorporating a rich, machine-interpretable representation of each data analysis in its repository. In an embodiment, such a representation should include the inputs (e.g., datasets) and outputs (e.g., estimates, p-values, predictions, clusters, etc.), as well as some information about the statistical methods employed.

Turning now to FIG. 1 illustrated is a block diagram of an example, non-limiting pipeline schematic 100 of dataflow graph transformation in accordance with one or more embodiments described herein.

In an embodiment, to build the flowgraph representation of the data analysis program, the system can trace a flow of objects during the execution of the data analysis program. This can be accomplished by latching into the programming language runtime environment 102, for example, the Python interpreter in one embodiment, and monitoring the functions that are called and how data is passed between them and trace the events and objects that are executed during the runtime environment 102.

The data analysis program or code can be in the form of a computer program in the form of either a source file or in a particular embodiment, an interactive notebook (a popular way of interacting with analyses written in Python), that executes a sequence of data analysis tasks. The data analysis program or code can be in any other appropriate computer language or format. A typical program would load one or more data sets, perform a statistical analysis, such as clustering, regression, or hypothesis testing, and display the results to the entity.

The raw graph 104 that is generated can be a representation of the object flow in a particular run of a computer program. The vertices of the raw graph 104 can correspond to function calls made in the runtime environment 102. A function call can be an expression in a program that initiates a function in a library of functions to perform a specific task or calculation. In an embodiment, usage of the phrase function can imply object-oriented programming functions that encompass static methods, instance methods, object attribute accessory, and etc. In an embodiment, the vertices of the graph can be labeled with the name of the called function. In another embodiment, there raw graph 104 can include edges between the vertices of the raw graph 104, where the edges can represent the objects that are outputted by the functions and passed between the functions. Objects can be data or data sets that are output by the functions associated with the function calls. In other embodiments, an object can be a programming construct comprising a data structure that comprises data as well as functions.

In an embodiment, the raw graph 104 can have a directed edge between a first vertex u and a second vertex v. The output of the function associated with the function call u can be an input for the function associated with the function call v. The edge can be labeled with an identifier that identifies that object being passed from vertex u to vertex v as well as an identifier that identifies the type of object being passed. In an embodiment, the object ID can be unique across the program run and not just unique among existing objects at the time of the function call u or v.

In one or more embodiments, the raw graph 104 can be a directed acyclic graph which is a directed graph with no directed cycles. That is, the raw graph 104 can include a finite number of vertices and edges, with each edge directed from one vertex to another, such that there is no way to start at any vertex v and follow a consistently-directed sequence of edges that eventually loops back to v again. Equivalently, raw graph 104 can be a directed graph that has a topological ordering, a sequence of the vertices such that every edge is directed from earlier to later in the sequence.

In an embodiment, the system can then generate an annotated graph 108 from the raw graph 104 by using an annotation database 106 that contains annotations or labels for the functions and objects on the raw graph 104. The system can apply annotations from the annotation database 106 for recognized functions. The recognized functions can be functions that have annotations assigned to or be associated with the functions. In an embodiment, the system can select the annotation database 106 with which to annotate the raw graph 104 based on the type of programming language used in the program or the runtime environment 102. In other embodiments, the annotation database 106 can be selected based on one or more functions that are called during the program run. The system can select a set of function calls and use them to search for matching annotations in a set of annotation databases, and select one or more of the annotation databases to use for annotating the raw graph.

In an embodiment, the system can annotate just the recognized functions and objects. If there are one or more unrecognized functions, the system can prune or collapse the vertices associated with the unrecognized function calls. The annotated function calls and the collapsed unrecognized function calls can result in the annotated graph 108.

In an embodiment, the annotated flow graph 108 that can be obtained from the raw graph 104 can be a bipartite directed acyclic graph. A bipartite graph (or bigraph) can be a graph whose vertices can be divided into two disjoint sets U and V (e.g., that is, U and V are each independent sets) such that every edge connects a vertex in U to one in V. As used herein, the vertex sets U and V can be considered or be referred to as parts of the bipartite graph.

Two different types of nodes on the annotated graph 108 can be referred to herein as entities and actions wherein entities correspond to objects and actions correspond to function calls. In some embodiments, an entity may correspond to multiple objects, and an action correspond to multiple function calls. In an embodiment, the annotated graph 108 can also be viewed as a directed hypergraph where the vertices are entities, and the hyperedges are actions.

From the annotated graph 108, the system can generate a semantic graph 112 that uses a knowledge base 110 of data analysis concepts to contextually label and taxonomize the annotated graph 108. In an embodiment, the knowledge base 110 can be an ontology log ("olog") that can contain types that taxonomize the objects in the ontology; aspects, which define functional relationships between types; and facts, which can represent equivalences between aspects. Mathematically, an olog can be a category whose objects are types, morphisms are aspects, and commutative diagrams are facts. The data analysis concepts that can comprise the knowledge base can be used to provide context for the annotations provided by the annotation database 106 and allow for characterizations of the types of programs running in the runtime environment 102 so that the program can be categorized and grouped with similar or related programs by searching for other data analysis programs that have similar or matching semantic labels. In this way, researchers working across different domains and fields can see if similar data analyses have been performed on similar data sets to facilitate the sharing of knowledge and research.

In an embodiment, the knowledge base 110 can be selected from a group of knowledge bases based on the type of program being run, or the annotation database 106 selected in the previous step.

The semantic labels provided on the semantic graph 112 can characterize or provide descriptions for various annotated functions/vertices and or objects/edges. In an embodiment, the semantic labels can cover single functions or objects, and in other embodiments, the semantic labels can cover or be associated with a group of functions and/or objects.

In an embodiment, the semantic graph 112 can be used to analyze data analysis programs submitted by various entities and compare different data-driven analyses by matching similar semantic labels. Such a comparison is used in the platform to foster collaboration among entities that work with similar or same data sets or address similar research questions. In an embodiment, the system disclosed herein can allow entities to find similar entities and connect them (e.g., find entities that are attacking the same research question using similar or different approaches). The system can also summarize all analyses applied on a data set or on addressing a particular research question and find all users that utilize a particular approach, irrespective of the data set used or the research problem addressed (e.g., find all users that implemented a clustering technique). The system can also identify patterns in the discoveries realized by models (e.g., 80% of users of a particular data set reached the same result). The system can group users of similar models (e.g., group entities that perform clustering on a particular data set or on different data sets).

The system can also detect similar outputs for potentially different models applied to the same data (e.g., 80% of entities reached similar results using different data-driven models) and direct one entity to successful users of a particular model (e.g., direct an entity that tries to employ k-means clustering with poor results to entities who were successful in employing different types of clustering on the same data). In another embodiment, the system can verify stability/validity of the model (e.g., compute p-values through simulation, resample the data and check the stability of the results of the analysis) and facilitate determining an optimal model in a supervised setting (e.g., determine the output and input of a model and compute any metrics that are useful for characterizing the quality of the model) and recognize different steps in the algorithm pipeline (e.g., a specific algorithm is employed at some point in the model).

Figure 2:
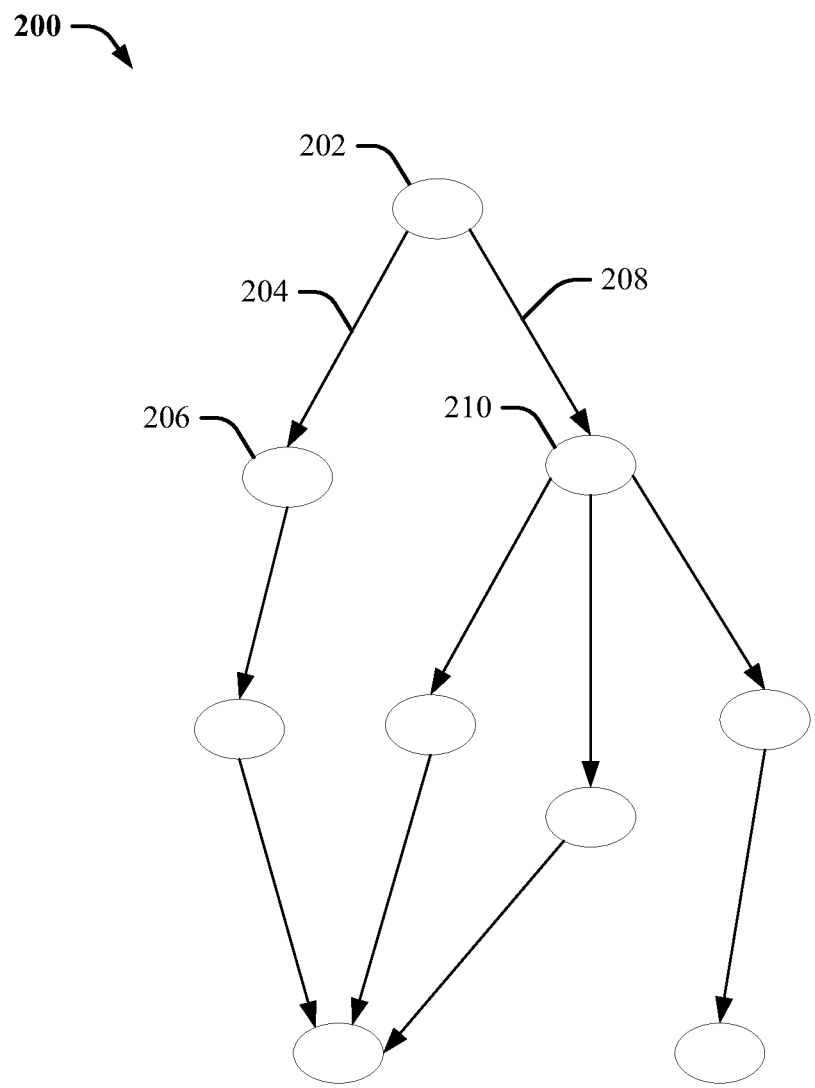
FIG. 2 illustrates another block diagram of an example, non-limiting system that generates a directed acyclic graph based on an execution of a data analysis program in accordance with one or more embodiments described herein.

Turning now to FIG. 2, illustrated is another block diagram of an example, non-limiting system that generates a directed acyclic graph or raw graph 200 based on an execution of a data analysis program in accordance with one or more embodiments described herein. Repetitive description of like elements employed in other embodiments described herein is omitted for sake of brevity.

The system can trace a flow of objects during the execution of the data analysis program to create a representation of the program analysis. This can be accomplished by hooking into the runtime environment of the data analysis, for example, the Python interpreter in one embodiment, and monitoring the functions that are called and how data is passed between them and trace the events and objects that are executed during the runtime environment.

The raw graph 200 that is generated can be a representation of the object flow in a particular run of a computer program. The vertices of the raw graph, e.g., 202, 206, 210, and etc., can correspond to function calls made in a runtime environment of the computer program. A function call can be an expression in a program that initiates a function in a library of functions to perform a specific task or calculation. In an embodiment, usage of the phrase function can imply object-oriented programming functions that encompass static methods, instance methods, object attribute accessory, and etc. In an embodiment, the vertices of the graph, 202, 206, and 210 can be labeled with the name of the called function. In another embodiment, there raw graph 200 can include edges between the vertices of the raw graph 200, e.g., 204, 208, and etc., where the edges can represent the objects that are outputted by the functions and passed between the functions. Objects can be data or data sets that are output by the functions associated with the function calls. In other embodiments, an object can be a programming construct comprising a data structure that comprises data as well as functions.

In an embodiment, the raw graph 200 can have a directed edge 204 between a first vertex 202 and a second vertex 206. The output of the function associated with the function call 202 can be an input for the function associated with the function call 206. The edge 204 can be labeled with an identifier that identifies that object being passed from vertex 202 to vertex 206 as well as an identifier that identifies the type of object 204 being passed. In an embodiment, the object ID can be unique across the program run and not just unique among existing objects at the time of the function calls 202 or 206.

In one or more embodiments, the raw graph 200 can be a directed acyclic graph which is a directed graph with no directed cycles. That is, the raw graph 200 can include a finite number of vertices and edges, with each edge directed from one vertex to another, such that there is no way to start at any vertex v and follow a consistently-directed sequence of edges that eventually loops back to v again. Equivalently, raw graph 200 can be a directed graph that has a topological ordering, a sequence of the vertices such that every edge is directed from earlier to later in the sequence.

Figure 3:
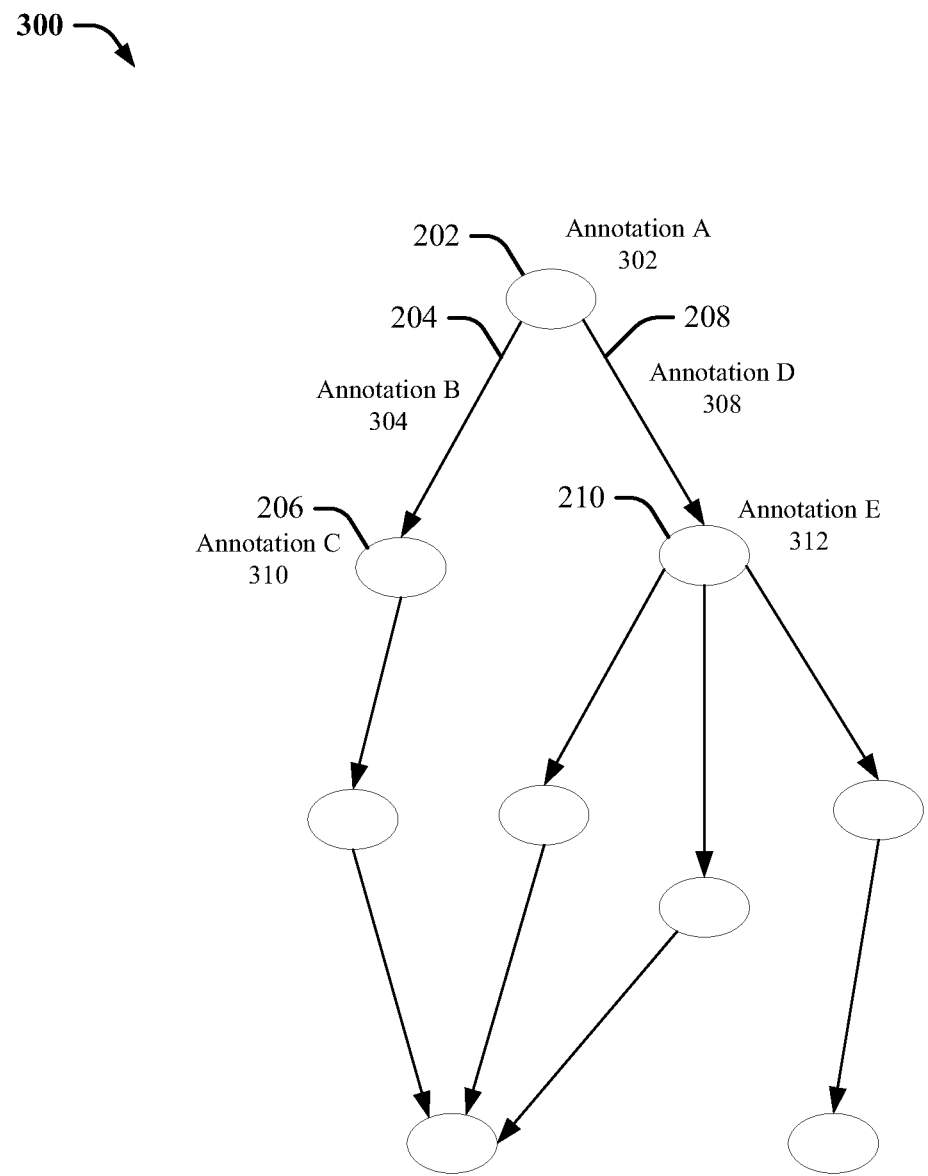
FIG. 3 illustrates another block diagram of example, non-limiting system that provides annotations for the directed acyclic graph in accordance with one or more embodiments described herein.

Turning now to FIG. 3, illustrated is a block diagram of example, non-limiting system that provides annotations for the directed acyclic graph to create an annotated graph 300 in accordance with one or more embodiments described herein. Repetitive description of like elements employed in other embodiments described herein is omitted for sake of brevity.

In an embodiment, the system can then generate the annotated graph 300 from the raw graph 200 by using an annotation database that contains annotations or labels for the functions and objects on the raw graph 200. The system can apply annotations from the annotation database for recognized functions. The recognized functions can be functions that have annotations assigned to or be associated with the functions. In an embodiment, the system can select the annotation database with which to annotate the raw graph 200 based on the type of programming language used in the program or the runtime environment. In other embodiments, the annotation database can be selected based on one or more functions that are called during the program run. The system can select a set of function calls and use them to search for matching annotations in a set of annotation databases, and select one or more of the annotation databases to use for annotating the raw graph 200.

In the embodiment shown in FIG. 3, vertices 202, 206, and 210 can be associated with recognized function calls, or function calls that have corresponding annotations in the annotation database. The system can thus annotate vertices 202, 206 and 310 with Annotation A 302, Annotation 310, and Annotation 312 respectively. Similarly, the edges 204 and 208 can be recognized and annotated with labels Annotation B 304 and Annotation D 308 respectively.

Figure 4:
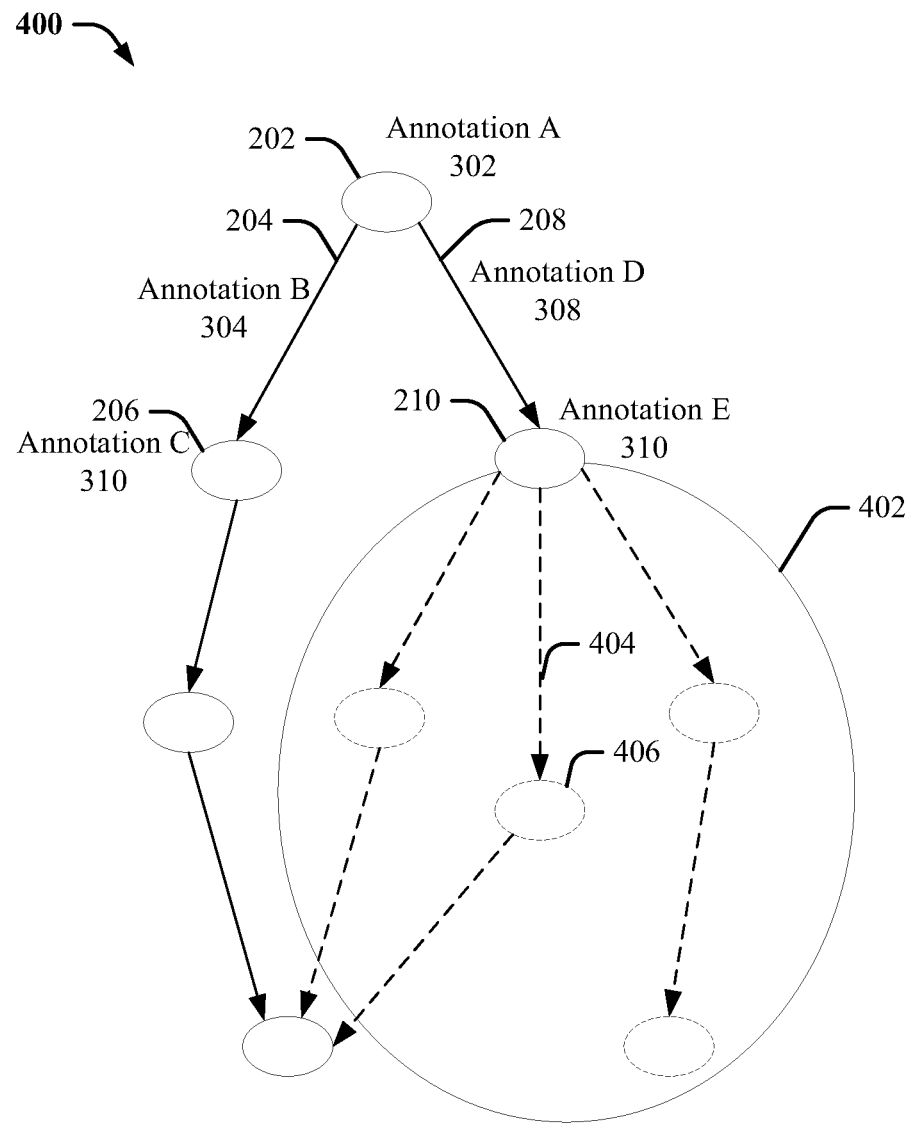
FIG. 4 illustrates another block diagram of example, non-limiting system that collapses unrecognized portions of the annotated graph in accordance with one or more embodiments described herein.

Turning now to FIG. 4, illustrated is a block diagram 400 of example, non-limiting system that collapses unrecognized portions of the annotated graph in accordance with one or more embodiments described herein. Repetitive description of like elements employed in other embodiments described herein is omitted for sake of brevity.

In an embodiment, the system can annotate just the recognized functions and objects. If there are one or more unrecognized functions or objects, such as function 406 and object 404, the system can prune or collapse the vertices and edges associated with the unrecognized function calls. In the embodiment shown in FIG. 4, the set of vertices and object with 402 can be unrecognized by one or more of the annotation systems. In other words, the functions and objects do not have annotation labels in one or more annotation databases searched by the system. Thus, the system can collapse the set of unrecognized vertices and edges, resulting in a simplified annotated graph. This simplified graph can be the finalized annotated graph.

Thus, the graph can be represented in a even simpler fashion by representing the objects as a first set of nodes, and the actions, or function calls, as a second set of nodes opposed to the first set of nodes. The edges on the bipartite graph can then represent relations between the objects and the function calls.

Figure 5:
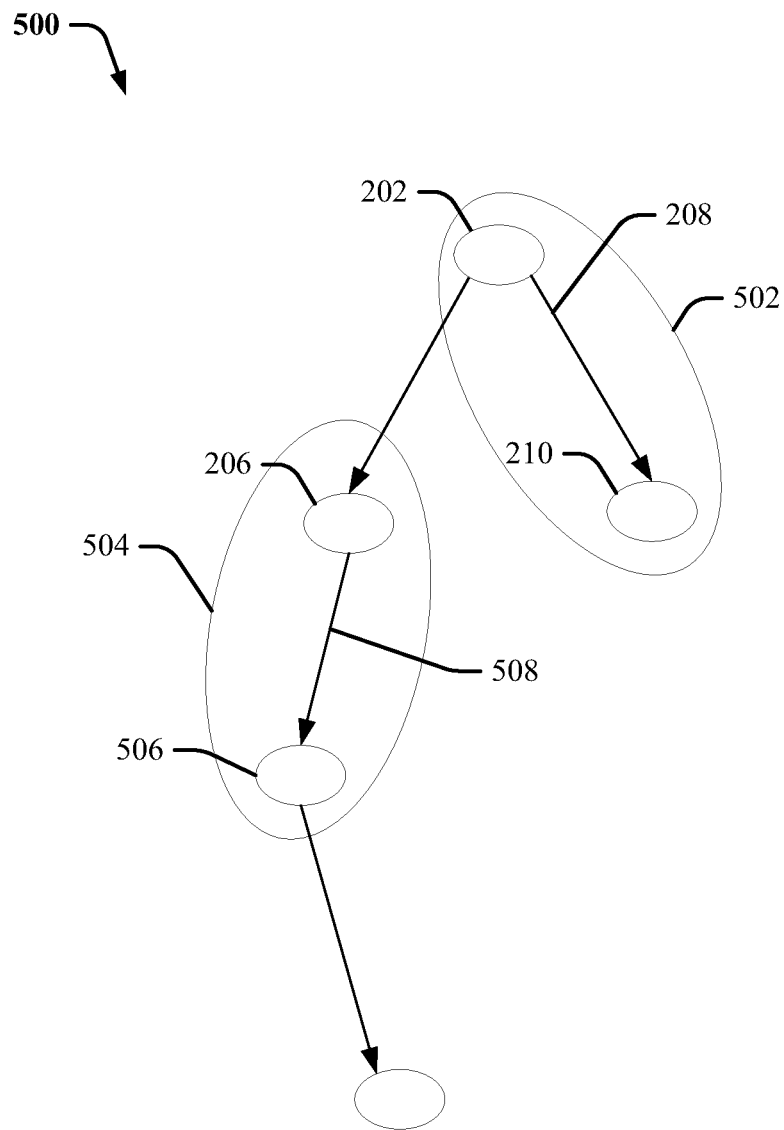
FIG. 5 illustrates another block diagram of example, non-limiting system that provides semantic labels for the annotated graph in accordance with one or more embodiments described herein.

Turning now to FIG. 5, illustrated is a block diagram 500 of example, non-limiting system that provides semantic labels for the annotated graph in accordance with one or more embodiments described herein. Repetitive description of like elements employed in other embodiments described herein is omitted for sake of brevity.

In the embodiment in FIG. 5, the annotated graph is the simplified form with the unrecognized elements, e.g., vertices and edges 402, collapsed, and removed from the graph. What is left behind can be the recognized functions and edges that had corresponding labels in the annotation database. The system can add semantic labels from the knowledge base to a vertices or group of vertices and/or edges based on the annotations. For instance, in the embodiment shown here, semantic label 502 encompasses the functions 202 and 210 as well as the object 208 passed between the functions 202 and 210. Similarly, the semantic label 504 can correspond to the vertex and 206 and 506 and the object 508. In other embodiments, the semantic labels can apply to a single vertex or other groups of vertices.

The semantic labels 502 and 504 can provide contextual understanding for the processes and analyses being undertaken by the data analysis program. The semantic labels 502 and 504 can be applied across other domains and be compared to semantic labels applied to other data analysis programs in the same or different programming languages to allow researchers to facilitate open data science collaboration.

Figure 6:
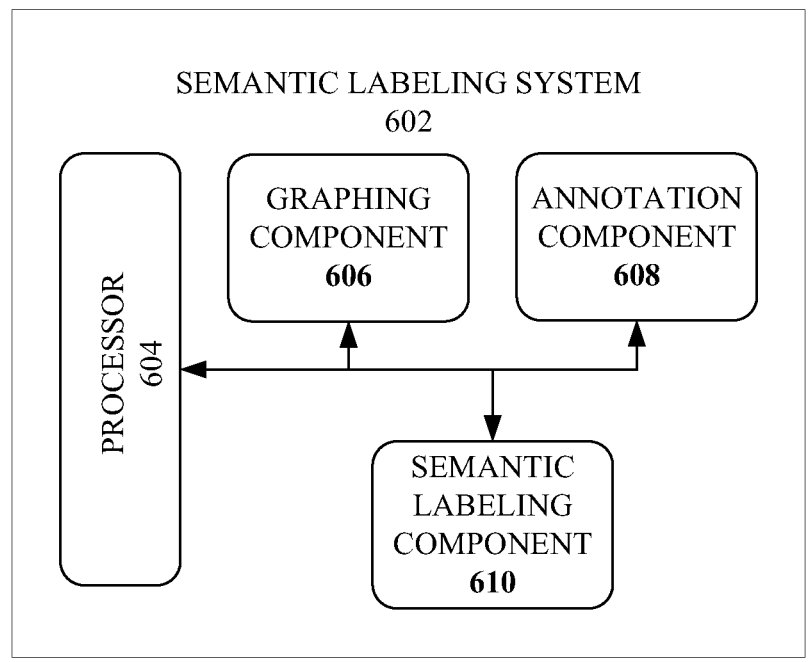
FIG. 6 illustrates a high-level block diagram of an example, non-limiting semantic labeling system in accordance with one or more embodiments described herein.

Turning now to FIG. 6, illustrated is a high-level block diagram 600 of an example, non-limiting semantic labeling system 602 in accordance with one or more embodiments described herein. Repetitive description of like elements employed in other embodiments described herein is omitted for sake of brevity.

In FIG. 6, the semantic labeling system 600 can include a processor 604, a graphing component 606, an annotation component 608, and a semantic labeling component 610.

The semantic labeling system 602 can be a cloud based system that enables the semantic labeling system. In other embodiments, semantic labeling system 602 can be based on a network or device that is performing the data analysis or is communicably coupled to the system executing the program. In an embodiment, the semantic labeling system 602 can include a processor 604 that that executes computer executable components stored in the memory. The components can include a graphic component 606 that generates a flow graph (e.g., raw graph 200) that represents an object flow of a data analysis program, where a node of the graph represents a function call in the data analysis program, and an edge connected to the node represents an output of a function associated with the function call. The components can also include an annotation component 608 that annotates the flow graph, resulting in an annotated flow graph (e.g., annotated graphs 300 or 400) that comprises an annotation label on a recognized function call. The components can also include a semantic labeling component 610 that matches the annotated flow graph to a set of semantic labels in a knowledge database resulting in a semantic flow graph (e.g., semantic graph 500).

In an embodiment, the graphing component 606 can trace a flow of objects during the execution of the data analysis program. This can be accomplished by hooking into a runtime environment of the data analysis program, for example, the Python interpreter in one embodiment, and monitoring the functions that are called and how data is passed between them and trace the events and objects that are executed during the runtime environment. In an embodiment, the graphic component 606 can access the runtime environment by accessing a source file in some embodiments, or an interactive notebook, or web application that facilitates interacting with the analyses and functions in the computer program.

In an embodiment, the raw graph that is generated by the graphing component 606 can be a representation of the object flow in a particular run of a computer program. The vertices of the raw graph can correspond to function calls made in the runtime environment. A function call can be an expression in a program that initiates a function in a library of functions to perform a specific task or calculation. In an embodiment, usage of the phrase function can imply object-oriented programming functions that encompass static methods, instance methods, object attribute accessors, and etc. In an embodiment, the vertices of the graph can be labeled with the name of the called function. In another embodiment, there raw graph can include edges in between the vertices of the raw graph, where the edges can represent the objects that are outputted by the functions and passed between the functions. Objects can be data or data sets that are output by the functions associated with the function calls. In other embodiments, an object can be a programming construct comprising a data structure that comprises data as well as functions.

In an embodiment, the raw graph can have a directed edge between a first vertex u and a second vertex v. The output of the function associated with the function call u can be an input for the function associated with the function call v. The edge can be labeled with an identifier that identifies that object being passed from vertex u to vertex v as well as an identifier that identifies the type of object being passed. In an embodiment, the object ID can be unique across the program run and not just unique among existing objects at the time of the function call u or v.

In one or more embodiments, the raw graph can be a directed acyclic graph which is a directed graph with no directed cycles. That is, the raw graph can include a finite number of vertices and edges, with each edge directed from one vertex to another, such that there is no way to start at any vertex v and follow a consistently-directed sequence of edges that eventually loops back to v again. Equivalently, raw graph can be a directed graph that has a topological ordering, a sequence of the vertices such that every edge is directed from earlier to later in the sequence.

The annotation component 608 can then generate an annotated graph from the raw graph by using an annotation database that contains annotations or labels for the functions and objects on the raw graph. The annotation component 608 can apply annotations from the annotation database for recognized functions. The recognized functions can be functions that have annotations assigned to or be associated with the functions. In an embodiment, the annotation component 608 can select the annotation database with which to annotate the raw graph based on the type of programming language used in the program or the runtime environment.

The semantic labeling component 610 can generate a semantic graph that uses a knowledge base of data analysis concepts to contextually label and taxonomize the annotated graph. In an embodiment, the knowledge base can be an ontology log ("olog") which contains types which taxonomize the objects in the ontology; aspects, which define functional relationships between types; and facts, which represent equivalences between aspects. Mathematically, an olog is a category whose objects are types, morphisms are aspects, and commutative diagrams are facts. The data analysis concepts that comprise the knowledge base can be used to provide context for the annotations provided by the annotation database and allow for characterizations of the types of programs running in the runtime environment so that the program can be categorized and grouped with similar or related programs. In this way, researchers working across different domains and fields can see if similar data analyses have been performed on similar data sets to facilitate the sharing of knowledge and research.

In an embodiment, the knowledge base can be selected from a group of knowledge bases based on the type of program being run, or the annotation database selected in the previous step. The semantic labels provided on the semantic graph can characterize or provide descriptions for various annotated functions/vertices and or objects/edges. In an embodiment, the semantic labels can cover single functions or objects, and in other embodiments, the semantic labels can cover or be associated with a group of functions and/or objects.

In one example, the system 602 can be a neural network (e.g., an artificial neural network, a machine learning neural network, etc.) associated with interconnected semantic labeling that provides an estimated functional model from a set of unknown inputs. In another example, the system 602 can be associated with a Bayesian network that provides a graphical model that represents relationships between a set of variables (e.g., a set of random variables). In yet another example, the system 602 can be associated with a hidden Markov model that models data over a continuous time interval and/or outputs a probability distribution. However, the system 602 can alternatively be associated with a different machine learning system such as, but not limited to, a clustering machine learning system, a decision tree machine learning system, an instance-based machine learning system, a regression machine learning system, a regularization machine learning system, rule learning machine learning system, etc. Furthermore, it is to be appreciated that the system 602 can be any number of different types of machine learning systems to facilitate a semantic labeling process associated with a network of interconnected processing components.

The system 602 and/or the components of the system 602 can be employed to use hardware and/or software to solve problems that are highly technical in nature (e.g., related to bioinformatics, authentication, compression, big data analysis etc.), that are not abstract and that cannot be performed as a set of mental acts by a human. Further, some of the processes performed may be performed by specialized computers for carrying out defined tasks related to the semantic labeling application/subject area. The system 602 and/or components of the system can be employed to solve new problems that arise through advancements in technology, computer networks, the Internet and the like. The system 602 can provide technical improvements to semantic labeling systems by improving processing efficiency among processing components in a data analysis comparison system, reducing delay in processing performed by processing components in a data analysis comparison system, avoiding or reducing the likelihood of network bottlenecks between processing components in a data analysis comparison system, and/or improving bandwidth utilization for a network of processing components in a data analysis comparison system, etc.

A processor 604 can be associated with at least one processor (e.g., a central processing unit, a graphical processing unit, etc.). In various embodiments, the processor 604 can be or include hardware, software (e.g., a set of threads, a set of processes, software in execution, etc.) or a combination of hardware and software that performs a computing task for machine learning (e.g., a machine learning computing task associated with received data). For example, the processor 604 can execute data analysis threads that cannot be performed by a human (e.g., are greater than the capability of a single human mind). For example, the amount of data processed, the speed of processing of the data and/or the data types processed by processing components 604 over a certain period of time can be respectively greater, faster and different than the amount, speed and data type that can be processed by a single human mind over the same period of time. For example, data processed by processing components 604 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processing components 604 can be fully operational towards performing one or more other functions (e.g., fully powered on, fully executed, etc.) while also processing the above-referenced data analysis data and runtime environment data.

Figure 7:
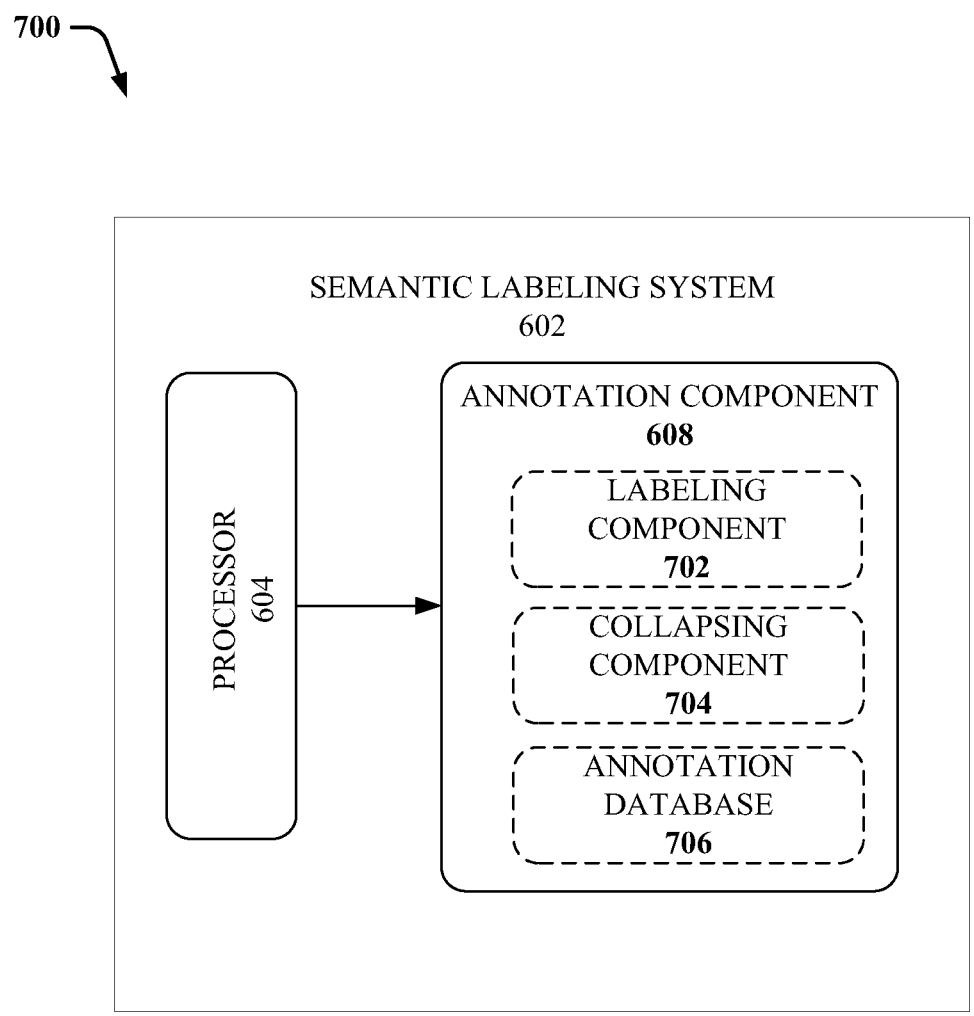
FIG. 7 illustrates a high-level block diagram of an example, non-limiting semantic labeling system and annotation component in accordance with one or more embodiments described herein.

Turning now to FIG. 7, illustrated is a high-level block diagram 700 of an example, non-limiting semantic labeling system 602 and annotation component 608 in accordance with one or more embodiments described herein. Repetitive description of like elements employed in other embodiments described herein is omitted for sake of brevity The annotation component 608 can include a labeling component 702 applies annotations from an annotation database 706 for recognized functions. The recognized functions can be functions that have annotations assigned to or be associated with the functions. In an embodiment, the labeling component 702 can select the annotation database 706 with which to annotate the raw graph based on the type of programming language used in the program or the runtime environment. In other embodiments, the annotation database 706 can be selected based on one or more functions that are called during the program run. The labeling component 702 can select a set of function calls and use them to search for matching annotations in a set of annotation databases, and select one or more of the annotation databases to use for annotating the raw graph.

In an embodiment, the labeling component 702 can annotate just the recognized functions and objects. If there are one or more unrecognized functions, the collapsing component 704 can prune or collapse the vertices associated with the unrecognized function calls. The annotated function calls and the collapsed, unrecognized function calls can result in the annotated graph.

Figure 8:
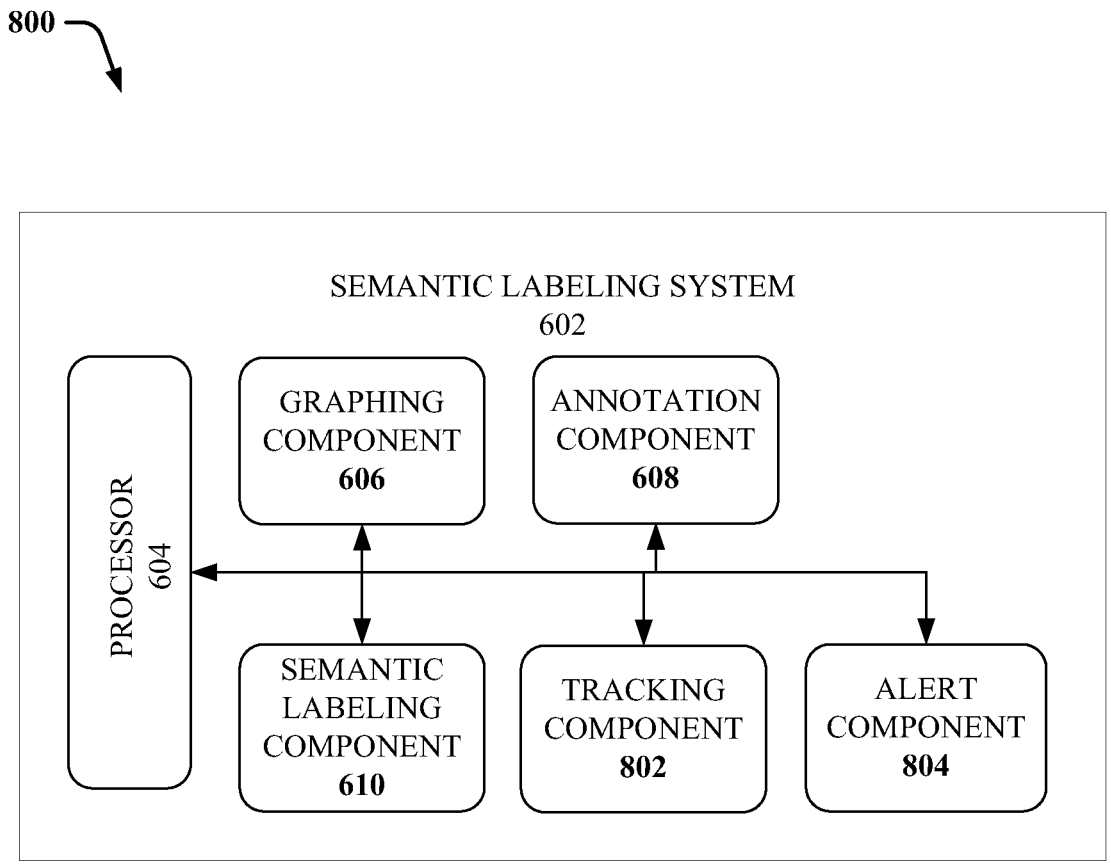
FIG. 8 illustrates another high-level block diagram of an example, non-limiting semantic labeling system in accordance with one or more embodiments described herein.

Turning now to FIG. 8, illustrated is another high-level block diagram 800 of an example, non-limiting semantic labeling system 602 in accordance with one or more embodiments described herein. Repetitive description of like elements employed in other embodiments described herein is omitted for sake of brevity.

The semantic labeling system 602 can include a tracking component 802 that compiles a set of statistics associated with semantic labels applied by the semantic labeling component 610 over a plurality of runs of data analysis programs. The tracking component 802 can also record instances of annotations applied by the annotation component 608 and keep statistics about how many times various annotations or semantic labels are applied. The tracking component 802 can record the number of instances of semantic labels applied, or can classify the semantic labels into types of related labels, and record statistics on how often related semantic labels are applied. In an embodiment, the tracking component 802 can track semantic labels applied by the semantic labeling component 610 over a plurality of runs (any predetermined number) of data analysis programs.

In an embodiment, alert component 804 can send notifications to a monitoring system or a entity whenever certain semantic labels have been applied by the semantic labeling component 610. In other embodiments, the alert component 804 can send alerts when the statistics tracked by the tracking component 802 have satisfied a predetermined condition. In an embodiment, the alert component 804 can generate a notification in response to the semantic labeling component 610 selecting a defined set of semantic labels.

The alert component 804 and tracking component 802 can facilitate enabling entity to find similar entities and connect them (e.g., find entities that are attacking the same research question using similar or different approaches). The tracking component 802 can also identify patterns in the discoveries realized by models (e.g., 80% of users of a particular data set reached the same result). The tracking component 802 can group users of similar models (e.g., group entities that perform clustering on a particular data set or on different data sets).

The tracking component 802 can also detect similar outputs for potentially different models applied to the same data (e.g., 80% of entities reached similar results using different data-driven models) and direct one entity to successful entities of a particular model (e.g., direct an entity that tries to employ k-means clustering with poor results to entities who were successful in employing different types of clustering on the same data). In another embodiment, the tracking component 802 can verify stability/validity of the model (e.g., compute p-values through simulation, resample the data and check the stability of the results of the analysis) and facilitate determining an optimal model in a supervised setting (e.g., determine the output and input of a model and compute any metrics that are useful for characterizing the quality of the model) and recognize different steps in the algorithm pipeline (e.g., a specific algorithm is employed at some point in the model).

While FIG. 7 depicts separate components in the annotation component 608, respectively, it is to be appreciated that two or more components can be implemented in a common component in each of FIGS. 6, 7, and 8. Further, it is to be appreciated that the design of the processor 604 and/or the graphic component 606, annotation component 608, and semantic labeling component 610 can include other component selections, component placements, etc., to facilitate processing for semantic labeling/or assignment of groups for parallel semantic labeling. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Turning now to FIG. 9, illustrated is a flow diagram 900 of an example, non-limiting computer-implemented method that facilitates semantic labeling of data analysis programs in accordance with one or more embodiments described herein. Repetitive description of like elements employed in other embodiments described herein is omitted for sake of brevity.

The method can begin at 902, where the method includes generating, by an device operatively coupled to a processing unit, a directed acyclic graph that traces a flow of objects during execution of a data analysis program, wherein vertices of the directed acyclic graph correspond to respective function calls (e.g., by graphing component 606).

The raw graph that is generated can be a representation of the object flow in a particular run of a computer program. The vertices of the raw graph can correspond to function calls made in the runtime environment. A function call can be an expression in a program that initiates a function in a library of functions to perform a specific task or calculation. In an embodiment, usage of the phrase function can imply object-oriented programming functions that encompass static methods, instance methods, object attribute accessors, and etc. In an embodiment, the vertices of the graph can be labeled with the name of the called function. In another embodiment, there raw graph can include edges between the vertices of the raw graph, where the edges can represent the objects that are outputted by the functions and passed between the functions. Objects can be data or data sets that are output by the functions associated with the function calls. In other embodiments, an object can be a programming construct comprising a data structure that comprises data as well as functions.

The method can continue at 904, where the method includes annotating, by the device, the directed acyclic graph by attaching an annotation to a vertex of the vertices, wherein the vertex corresponds to a recognized function call, and wherein the annotating generates an annotated flow graph (e.g., by annotation component 608). The annotations from an annotation database for recognized functions. The recognized functions can be functions that have annotations assigned to or be associated with the functions. In an embodiment, the system can select the annotation database with which to annotate the raw graph based on the type of programming language used in the program or the runtime environment. In other embodiments, the annotation database can be selected based on one or more functions that are called during the program run. The system can select a set of function calls and use them to search for matching annotations in a set of annotation databases, and select one or more of the annotation databases to use for annotating the raw graph.

In an embodiment, the system can annotate just the recognized functions and objects. If there are one or more unrecognized functions, the system can prune or collapse the vertices associated with the unrecognized function calls. The annotated function calls and the collapsed, unrecognized function calls can result in the annotated graph.

The method can continue at 906 where the method includes generating, by the device, a semantic flow graph by matching the annotated flow graph to semantic terms of a knowledge database (e.g., by semantic labeling component 610). In an embodiment, the knowledge base can be selected from a group of knowledge bases based on the type of program being run, or the annotation database selected previously. The semantic labels provided on the semantic graph can characterize or provide descriptions for various annotated functions/vertices and or objects/edges. In an embodiment, the semantic labels can cover single functions or objects, and in other embodiments, the semantic labels can cover or be associated with a group of functions and/or objects.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a machine learning process (e.g., a semantic labeling process), transmit data that can include a sequence of bits corresponding to information generated during a machine learning process (e.g., a semantic labeling process), etc.

Figure 10:
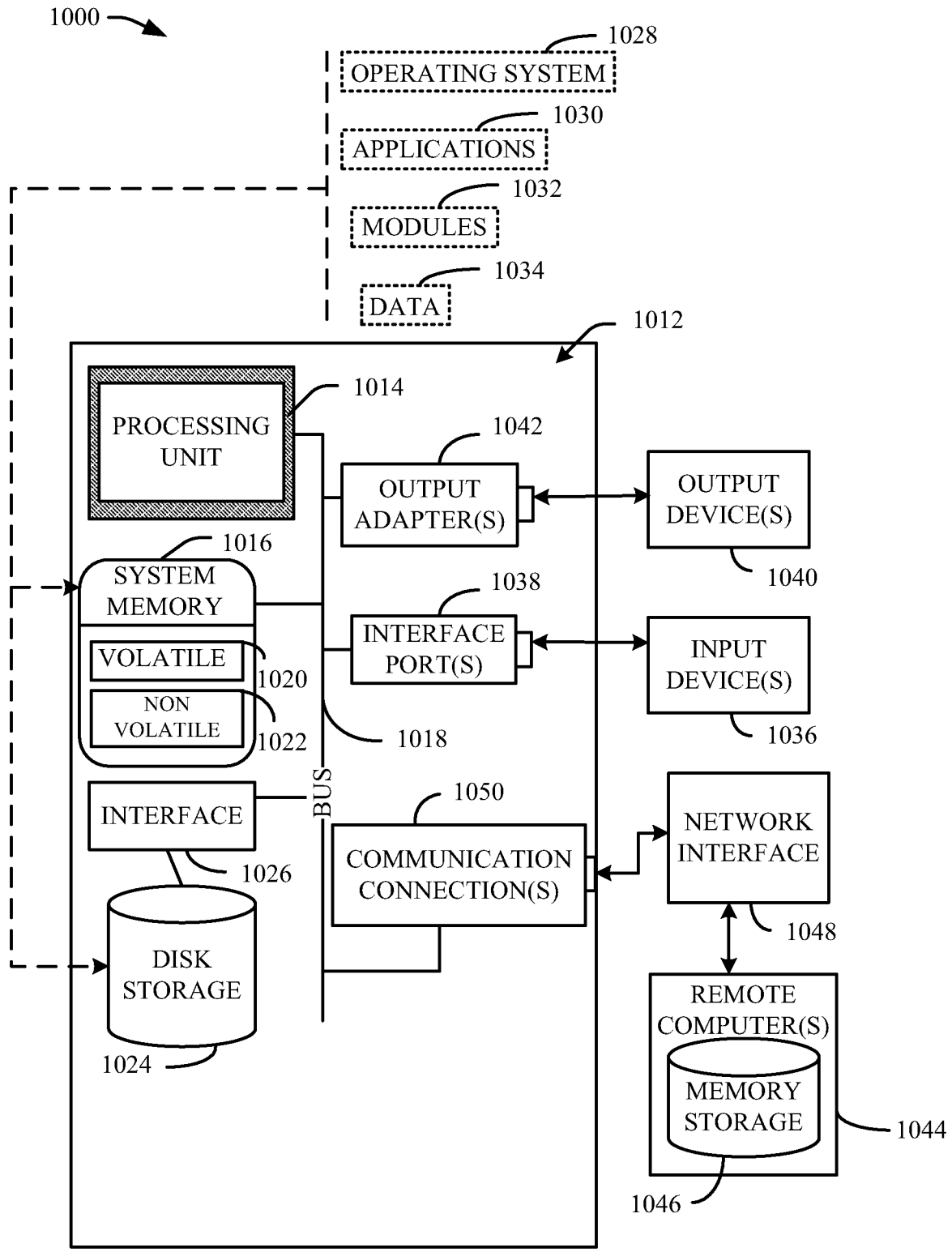
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. An entity enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
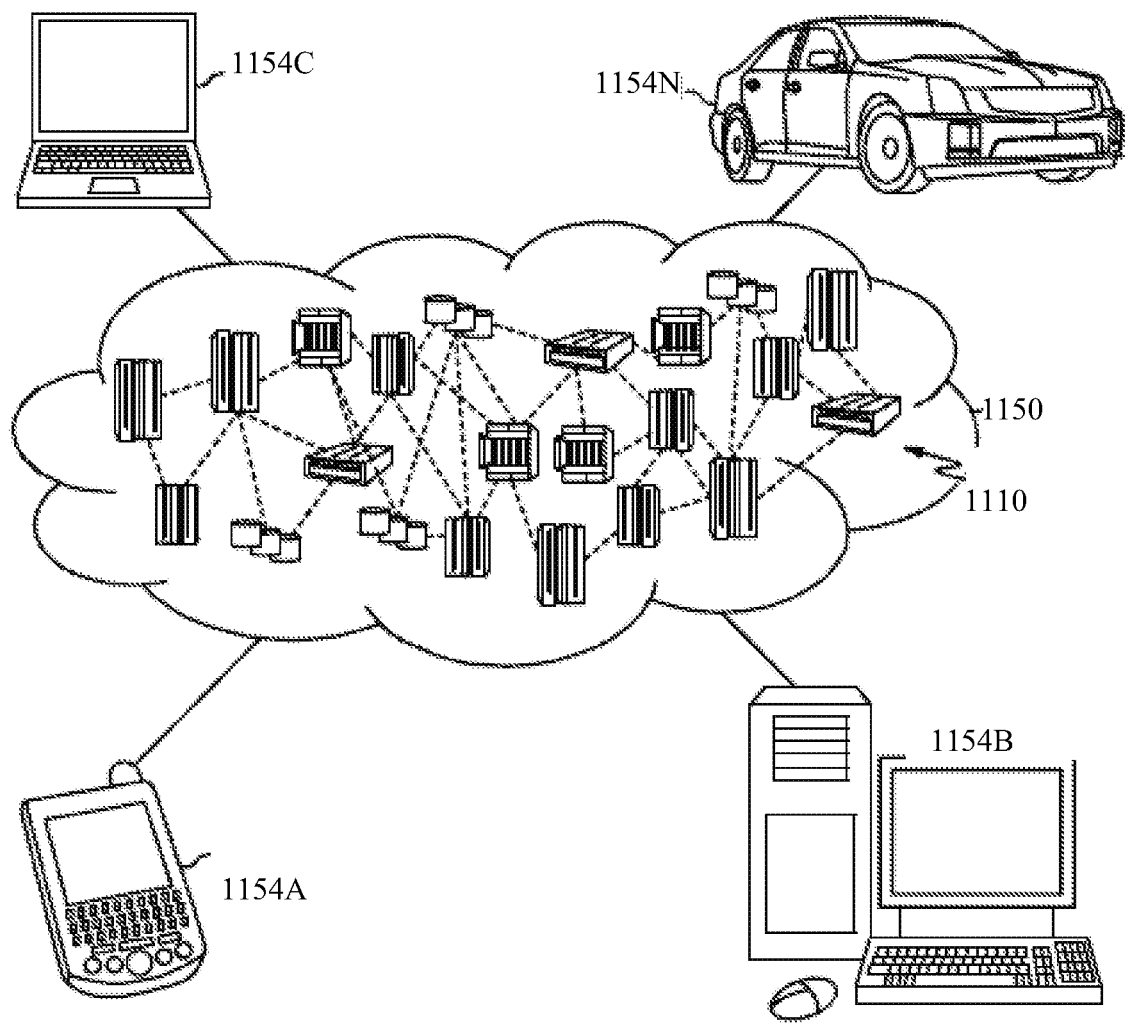
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1654A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
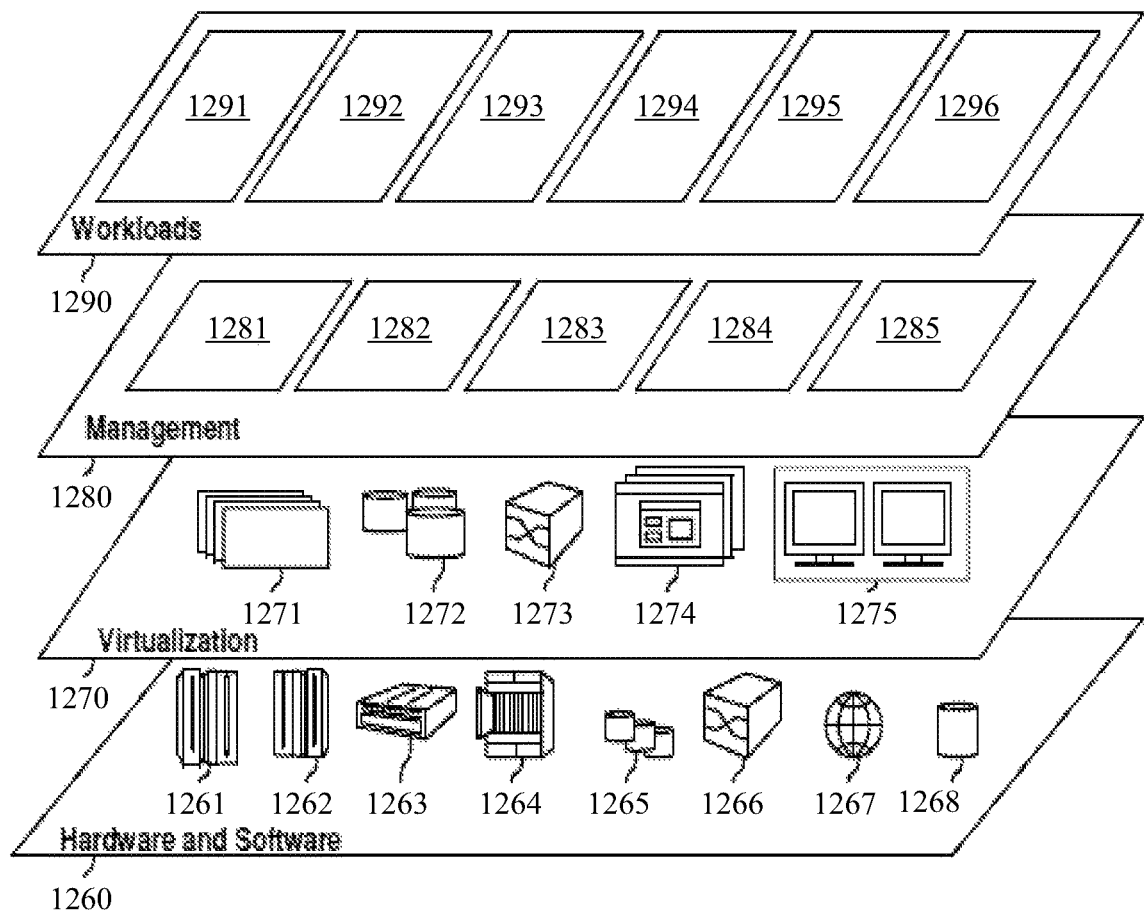
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and transaction model software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

generating, by a device operatively coupled to a processing unit, a directed acyclic graph that traces a flow of objects during execution of a data analysis program, wherein vertices of the directed acyclic graph correspond to respective function calls of a plurality of function calls during the execution of the data analysis program, and an edge connected to the node represents an output of a function associated with the function call;

annotating, by the device, for respective recognized function calls of the plurality of function calls that are determined to have matching annotation labels in a set of annotation databases, first vertices of the vertices of the directed acyclic graph corresponding to the respective recognized function calls with their matching annotation labels, wherein the annotating generates an annotated directed acyclic graph comprising annotated function calls;

removing, by the device, second vertices of the vertices from the annotated directed acyclic graph corresponding to respective unrecognized function calls of the plurality of function calls that are determined not to have matching annotation labels in the set of annotation databases, and removing, by the device, edges connected to the second vertices from the annotated directed acyclic graph;

annotating, by the device the node of the directed acyclic graph with a name of the function associated with the function call, annotating, by the device, the edge with a name of the object being output by the function;

annotating, by the device, first the vertices based on an annotation database of the set of annotation databases, selected based on a type of programming language of the data analysis program;

identifying, by the device, a taxonomy of functions;

taxonomizing, by the device, the annotated directed acyclic graph based on the taxonomy of functions and the respective recognized function calls, resulting in the respective recognized function calls being semantically grouped by concept, resulting in a semantic directed acyclic graph;

facilitating, by the device, identifying a similar data analysis program based on the semantic directed acyclic graph, wherein the similar data analysis program comprises data analysis functions and data sets that are conceptually similar to the data analysis program; and tracking, by the device, semantic labels of the set of semantic labels matched by the semantic labeling component over a plurality of runs of data analysis programs.

2. The computer-implemented method of claim 1, wherein the taxonomizing the annotated directed acyclic graph further comprises:

labeling, by the device, respective annotated function calls with a name of a concept corresponding to a group within which the respective annotated function calls are comprised.

3. The computer-implemented method of claim 1, wherein the generating the directed acyclic graph further comprises:

labeling, by the device, an edge between the vertices with a name that identifies one or more objects being passed from a first vertex to a second vertex of the vertices.

4. The computer-implemented method of claim 1, further comprising:

receiving, by the device, the data analysis program via a web application.

5. The computer-implemented method of claim 1, wherein the annotating further comprises:

annotating the directed acyclic graph based on an annotation database selected based on the data analysis program.

6. The computer-implemented method of claim 1, wherein the taxonomizing comprises employing semantic terms of the taxonomy to taxonomize the annotated directed acyclic graph by:

identifying a set of types that correspond to the annotated directed acyclic graph, and defining a functional relationship between types of the set of types using functional aspects, and defines an equivalence between the functional aspects by employing a commutative diagram of the taxonomy.

7. The computer-implemented method of claim 1, wherein a function call of the recognized function calls is in a library associated with the data analysis program.

* * * * *